(12) United States Patent
Niimi et al.

(10) Patent No.: US 11,411,410 B2
(45) Date of Patent: Aug. 9, 2022

(54) CHARGING DEVICE

(71) Applicant: TOYOTA JIDOSHA KABUSHIKI KAISHA, Toyota (JP)

(72) Inventors: Yoshitaka Niimi, Susono (JP); Naoyoshi Takamatsu, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 386 days.

(21) Appl. No.: 16/680,813

(22) Filed: Nov. 12, 2019

(65) Prior Publication Data

US 2020/0161878 A1 May 21, 2020

(30) Foreign Application Priority Data

Nov. 15, 2018 (JP) .............................. JP2018-215022

(51) Int. Cl.
*H02J 7/00* (2006.01)
(52) U.S. Cl.
CPC ......... *H02J 7/0016* (2013.01); *H02J 2207/20* (2020.01)
(58) Field of Classification Search
CPC ....................................................... H02J 7/00
See application file for complete search history.

(56) References Cited

U.S. PATENT DOCUMENTS

2006/0164028 A1  7/2006  Welchko et al.
2014/0343776 A1* 11/2014  Ang ...................... H02J 7/0013
                                                 701/22

FOREIGN PATENT DOCUMENTS

JP     2006-238686 A    9/2006
JP     2020-5389 A      1/2020

* cited by examiner

*Primary Examiner* — Robert Grant
(74) *Attorney, Agent, or Firm* — Sughrue Mion, PLLC

(57) ABSTRACT

A charging device includes: a power supply circuit including a first inverter connected between a first storage battery and a load, and a second inverter connected between a second storage battery and the load, the power supply circuit being configured to drive the one load; a charging port configured to be connected to an external power supply when the first storage battery and the second storage battery are charged with power from the external power supply; and a relay configured to allow current to bypass the first inverter, the second inverter, and the load between a positive electrode terminal of the charging port and a negative electrode terminal of the charging port, when the first storage battery and the second storage battery are charged with the power from the external power supply.

8 Claims, 5 Drawing Sheets

CHARGING DEVICE

CROSS-REFERENCE TO RELATED APPLICATION(S)

The present application claims priority to and incorporates by reference the entire contents of Japanese Patent Application No. 2018-215022 filed in Japan on Nov. 15, 2018.

BACKGROUND

1. Technical Field of the Invention

The present disclosure relates to a charging device.

2. Related Art

JP 2006-238686 A discloses, as a double-ended inverter system mounted in a vehicle, a power supply circuit that drives one load with two storage batteries and two inverters.

SUMMARY

In order to quickly charge a storage battery mounted in a vehicle with power from an external power supply, direct current (DC) power from an external power supply is supplied to the storage battery mounted in the vehicle. At the time of this quick charging, current larger than conventional current flows, and large heat can be generated in the inverters and the load during charging in the above double-ended inverter system. In addition, charging efficiency is reduced when current flows through the inverters and the load at the time of the charging from the external power supply.

It is desirable to provide a charging device that can improve the charging efficiency when a storage battery is charged with power supplied from an external power supply and that can prevent heat from being generated in inverters and a load.

In some embodiments, a charging device includes: a power supply circuit including a first inverter connected between a first storage battery and a load, and a second inverter connected between a second storage battery and the load, the power supply circuit being configured to drive the one load; a charging port configured to be connected to an external power supply when the first storage battery and the second storage battery are charged with power from the external power supply; and a relay configured to allow current to bypass the first inverter, the second inverter, and the load between a positive electrode terminal of the charging port and a negative electrode terminal of the charging port, when the first storage battery and the second storage battery are charged with the power from the external power supply.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, a charging device in embodiments of the disclosure is specifically described with reference to the drawings. Note that, the disclosure is not limited to the embodiments described below.

First Embodiment

Figure 1:
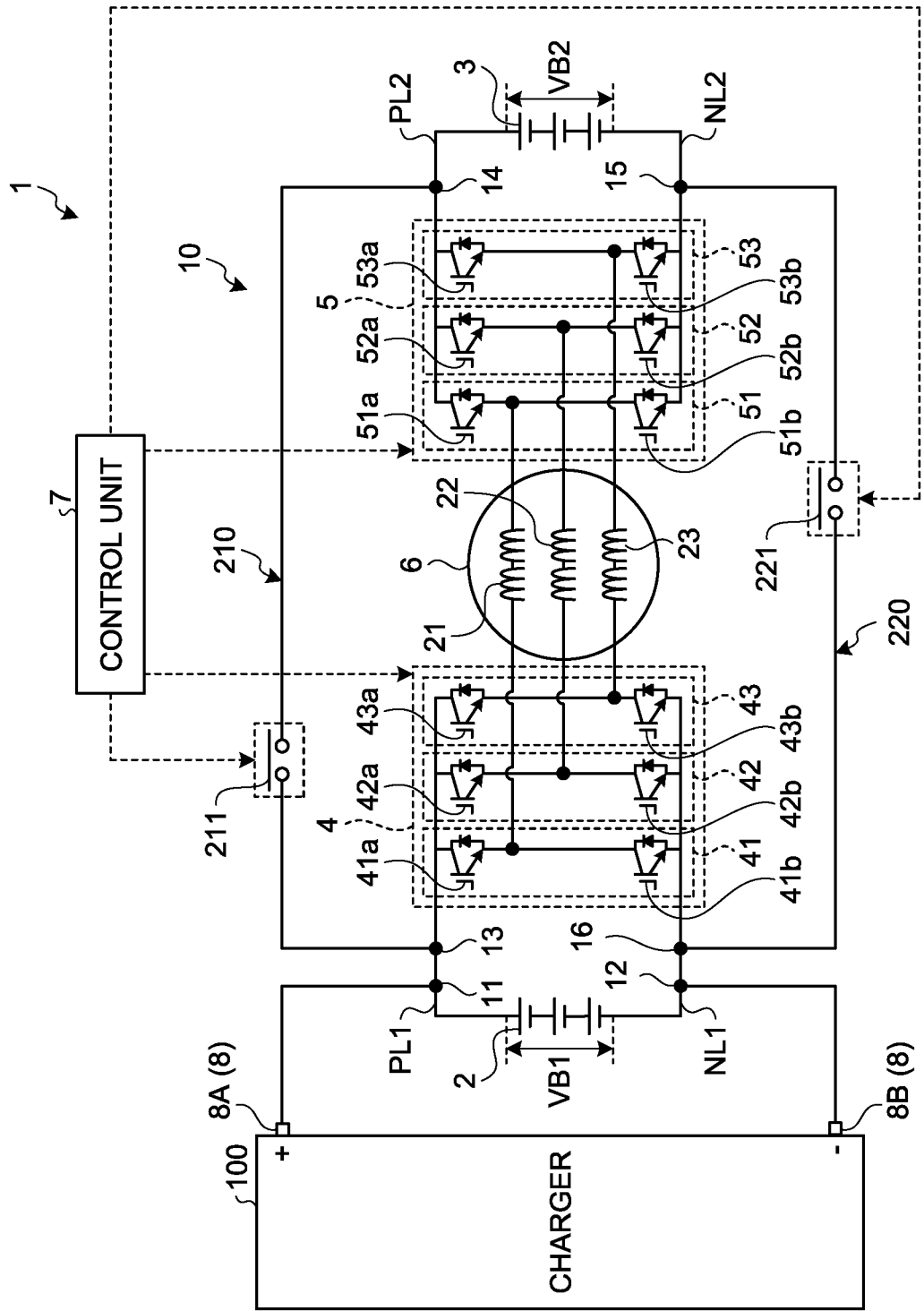
FIG. 1 is a diagram schematically illustrating a charging device in a first embodiment.

FIG. 1 is a diagram schematically illustrating a charging device in a first embodiment. As illustrated in FIG. 1, a charging device 1 in the first embodiment includes a power supply circuit 10 that drives one motor 6 with two storage batteries 2 and 3 and two inverters 4 and 5. The power supply circuit 10 is a double-ended inverter system. The charging device 1 further includes a control unit 7 that controls the two inverters 4 and 5, and a charging port 8 to be connected to a charger 100, which is an external power supply.

The power supply circuit 10 converts DC power output from the first storage battery 2 into alternating current (AC) power with the first inverter 4 and supplies the AC power from the first inverter 4 to the motor 6. The motor 6 is driven by the AC power. The power supply circuit 10 further converts DC power output from the second storage battery 3 into AC power with the second inverter 5 and supplies the AC power from the second inverter 5 to the motor 6. In this manner, the drive of the motor 6 is controlled by command signals output from the control unit 7 to the two inverters 4 and 5. In the power supply circuit 10, the first storage battery 2 and the second storage battery 3 are connected via the first inverter 4, the motor 6, and the second inverter 5.

The first storage battery 2 is implemented by a secondary battery capable of charging and discharging, and is electrically connected to the first inverter 4 via a positive-electrode-side line PL1 and a negative-electrode-side line NL1. The power discharged from the first storage battery 2 is supplied to the motor 6 via the first inverter 4.

The second storage battery 3 is implemented by a secondary battery capable of charging and discharging, and is electrically connected to the second inverter 5 via a positive-electrode-side line PL2 and a negative-electrode-side line NL2. The power discharged from the second storage battery 3 is supplied to the motor 6 via the second inverter 5.

The first inverter 4 and the second inverter 5 are each implemented by an inverter circuit including a plurality of switching elements and diodes for each phase so that currents of three phases can each flow in a winding. In each of the inverters 4 and 5, DC power can be converted into AC power by a switching operation in which the switching elements are switched on or off.

The first inverter 4 includes six switching elements 41a, 41b, 42a, 42b, 43a, and 43b constituting upper and lower arms 41, 42, and 43 of respective phases (a U phase, a V phase, and a W phase). In the U-phase upper and lower arms 41, the switching element 41a, which is the upper arm element, and the switching element 41b, which is the lower arm element, are connected in series. In the V-phase upper and lower arms 42, the switching element 42a, which is the upper arm element, and the switching element 42b, which is the lower arm element, are connected in series. In the W-phase upper and lower arms 43, the switching element 43a, which is the upper arm element, and the switching element 43b, which is the lower arm element, are connected in series. The switching elements 41a, 41b, 42a, 42b, 43a, and 43b are each implemented by a transistor element. In addition, a diode is connected in parallel to each of the switching elements 41a, 41b, 42a, 42b, 43a, and 43b.

The second inverter 5 includes six switching elements 51a, 51b, 52a, 52b, 53a, and 53b constituting upper and lower arms 51, 52, and 53 of respective phases (a U phase, a V phase, and a W phase). In the U-phase upper and lower arms 51, the switching element 51a, which is the upper arm element, and the switching element 51b, which is the lower arm element, are connected in series. In the V-phase upper and lower arms 52, the switching element 52a, which is the upper arm element, and the switching element 52b, which is the lower arm element, are connected in series. In the W-phase upper and lower arms 53, the switching element 53a, which is the upper arm element, and the switching element 53b, which is the lower arm element, are connected in series. The switching elements 51a, 51b, 52a, 52b, 53a, and 53b are each implemented by a transistor element. In addition, a diode is connected in parallel to each of the switching elements 51a, 51b, 52a, 52b, 53a, and 53b.

The motor 6 is electrically connected to the first storage battery 2 via the first inverter 4, and is electrically connected to the second storage battery 3 via the second inverter 5. The motor 6 is implemented by a three-phase AC motor. The windings of three phases (a U-phase winding 21, a V-phase winding 22, and a W-phase winding 23) wound around the stator of motor 6 are each electrically connected to the inverter 4 and 5. The U-phase winding 21 is connected to the U-phase upper and lower arms 41 of the first inverter 4, and the U-phase upper and lower arms 51 of the second inverter 5. The V-phase winding 22 is connected to the V-phase upper and lower arms 42 of the first inverter 4, and the V-phase upper and lower arms 52 of the second inverter 5. The W-phase winding 23 is connected to the W-phase upper and lower arms 43 of the first inverter 4, and the W-phase upper and lower arms 53 of the second inverter 5. The motor 6 is driven by the current flowing through the three phase windings 21, 22, and 23. The motor 6 is a load connected to the power supply circuit 10 and functions as a power source for traveling when the charging device 1 is mounted in a vehicle.

The control unit 7 is implemented by an electronic control unit (ECU) including a CPU, a storage unit storing data, such as various programs, and a calculation processing unit that performs various calculations for driving and controlling the motor 6. For example, the control unit 7 outputs, to the inverters 4 and 5, a command signal for controlling the inverters 4 and 5 as a result of the calculation of the calculation processing unit. The command signal includes a switching command for switching a switching element to be controlled in the switching operation among the switching elements constituting the two inverters 4 and 5.

The charging port 8 is a connection port to be connected to the charger 100, which is a charging facility, when the storage batteries 2 and 3 of the charging device 1 are charged with power from an external power supply. The charger 100 is implemented by, for example, a charging stand including a cable and a charging plug (both are not illustrated). The charging plug of the charger 100 is connected to the charging port 8.

In addition, the charging port 8 is electrically connected to the power supply circuit 10 in the charging device 1. A positive electrode terminal 8A of the charging port 8 is connected to the positive electrode side of the first storage battery 2. A negative electrode terminal 8B of the charging port 8 is connected to the negative electrode side of the first storage battery 2. As illustrated in FIG. 1, the positive electrode terminal 8A of the charging port 8 is connected to a first connection point 11 provided on the positive-electrode-side line PL1 between the positive electrode of the first storage battery 2 and the first inverter 4. In addition, the negative electrode terminal 8B of the charging port 8 is connected to a second connection point 12 provided on the negative-electrode-side line NL1 between the negative electrode of the first storage battery 2 and the first inverter 4.

The charging device 1 further includes a bypass circuit that allows current to bypass the inverters 4 and 5 and the motor 6 when the storage batteries 2 and 3 are charged with the power from the charger 100. The bypass circuit includes a first bypass circuit 210 and a second bypass circuit 220.

The first bypass circuit 210 forms a path for bypassing the inverters 4 and 5 and the motor 6 between the positive electrode of the first storage battery 2 and the positive electrode of the second storage battery 3. As illustrated in FIG. 1, on the positive electrode side of the first storage battery 2, the first bypass circuit 210 is connected to a third connection point 13 provided between the first connection point 11 and the first inverter 4. The downstream side of the first bypass circuit 210 is connected to a fourth connection point 14 provided on the positive-electrode-side line PL2 between the positive electrode of the second storage battery 3 and the second inverter 5. In addition, the first bypass circuit 210 includes a first relay 211. The first relay 211 switches between an opened state and a closed state, and selectively conductively connects the first bypass circuit 210. The first relay 211 is controlled by the control unit 7 to be opened or closed. At the time of charging from the external power supply, the first relay 211 is closed. At other times, the first relay 211 is opened.

The second bypass circuit 220 forms a path for bypassing the inverters 4 and 5 and the motor 6 between the negative electrode of the second storage battery 3 and the negative electrode of the first storage battery 2. As illustrated in FIG. 1, the upstream side of the second bypass circuit 220 is connected to a fifth connection point 15 provided on the negative-electrode-side line NL2 between the negative electrode of the second storage battery 3 and the second inverter 5. On the negative electrode side of the first storage battery 2, the second bypass circuit 220 is connected to a sixth connection point 16 provided between the second connection point 12 and the first inverter 4. In addition, the second bypass circuit 220 includes a second relay 221. The second relay 221 switches between an opened state and a closed state, and selectively conductively connects the second bypass circuit 220. The second relay 221 is controlled by the control unit 7 to be opened and closed. At the time of charging from the external power supply, the second relay 221 is closed. At other times, the second relay 221 is opened.

In the charging device 1 in the first embodiment, when the storage batteries 2 and 3 are charged with the power from the charger 100, the two storage batteries 2 and 3 are being connected in parallel (in a parallel connection state) while the inverters 4 and 5 and the motor 6 are bypassed.

Figure 2:
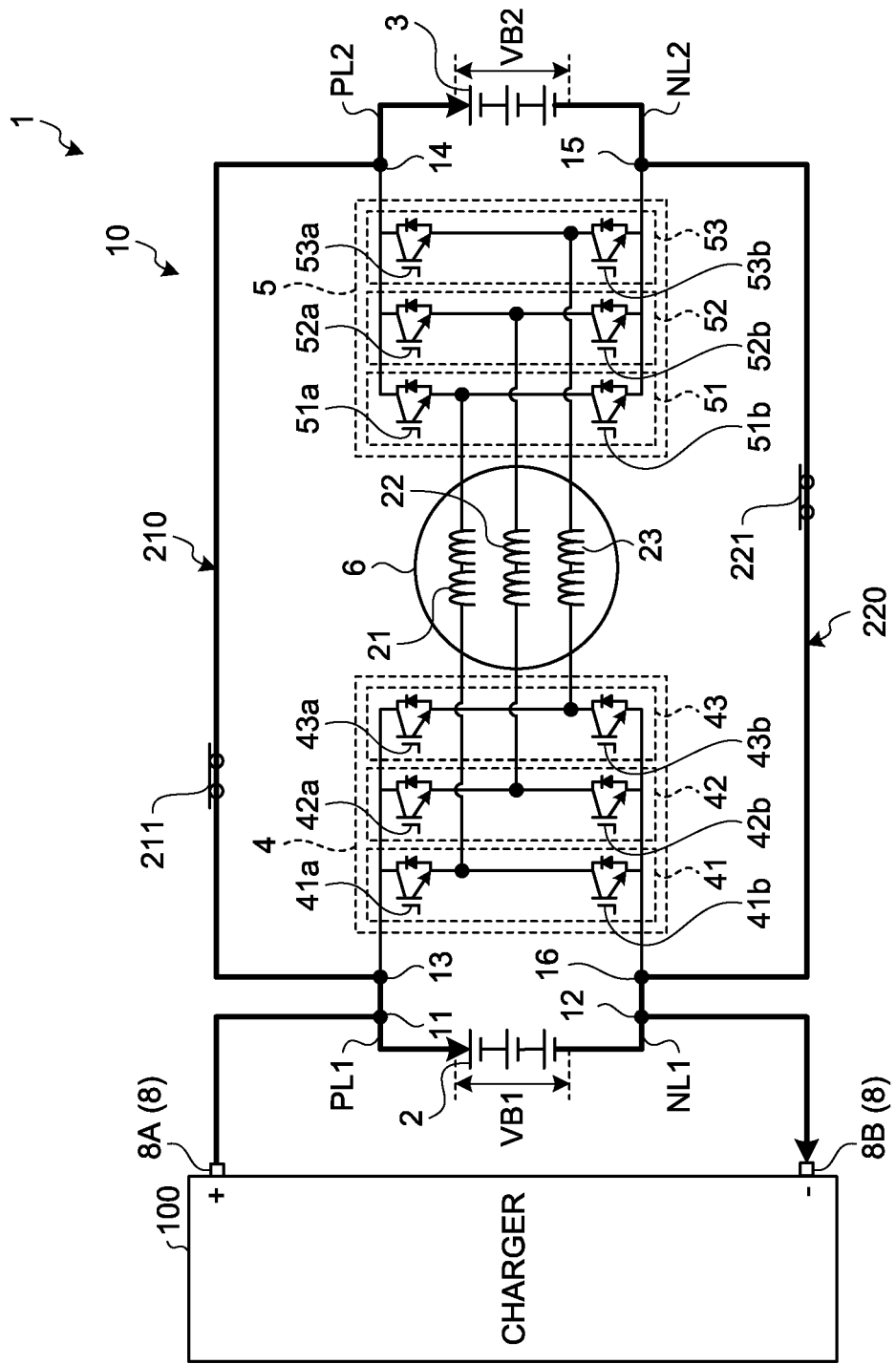
FIG. 2 is a diagram illustrating a connection state when the charging device in the first embodiment is charged with power supplied from an external power supply.

FIG. 2 is a diagram illustrating a connection state when the charging device in the first embodiment is charged with power supplied from the external power supply. As illustrated in FIG. 2, at the time of charging, the first relay 211 and the second relay 221 are turned on (ON) to connect the first bypass circuit 210 and the second bypass circuit 220. Thus, the charging plug of the charger 100 is connected to the charging port 8 while the first storage battery 2 and the second storage battery 3 are being connected in parallel to bypass the inverters 4 and 5 and the motor 6. Note that, the resistance value of the first bypass circuit 210 while the first relay 211 is being closed (in the connection state) is less than the resistance value of the circuit passing through the first inverter 4, the motor 6, and the second inverter 5. Similarly, the resistance value of the second bypass circuit 220 while the second relay 221 is being closed (in the connection state) is less than the resistance value of the circuit passing through the first inverter 4, the motor 6, and the second inverter 5.

When DC power from the charger 100, which is the external power supply, is supplied to the charging device 1 in the connection state illustrated in FIG. 2, current flows from the positive electrode terminal 8A of the charging port 8 into the power supply circuit 10, and the current is divided at the first connection point 11 into the current on the first storage battery 2 side and the current on the second storage battery 3 side.

On the first storage battery 2 side, the current flows from the first connection point 11 into the positive electrode of the first storage battery 2. Then, the current flows from the negative electrode side of the first storage battery 2 into the negative electrode terminal 8B of the charging port 8 via the second connection point 12.

On the second storage battery 3 side, the current flows from the first connection point 11 into the first bypass circuit 210 via the third connection point 13. This current reaches the fourth connection point 14 via the first bypass circuit 210 and the first relay 211. This current flows from the fourth connection point 14 into the positive-electrode-side line PL2, and flows into the positive electrode of the second storage battery 3 via the positive-electrode-side line PL2. Thereafter, the current flowing from the negative electrode of the second storage battery 3 into the negative-electrode-side line NL2 reaches the fifth connection point 15. Then, the current flows from the fifth connection point 15 into the second bypass circuit 220. This current reaches the sixth connection point 16 via the second bypass circuit 220 and the second relay 221. The current flowing from the sixth connection point 16 into the negative-electrode-side line NL1 merges at the second connection point 12 with the current flowing from the negative electrode of the first storage battery 2 into the negative-electrode-side line NL1. Thus, the current merged at the second connection point 12 flows from the second connection point 12 into the negative electrode terminal 8B of the charging port 8.

As described above, according to the charging device 1 in the first embodiment, by causing current to flow into the first bypass circuit 210 and the second bypass circuit 220 when the storage batteries 2 and 3 are charged with the power from the external power supply, it is possible to bypass the inverters 4 and 5 and the motor 6. Thus, it is possible to improve the charging efficiency, and to prevent heat from being generated due to the conduction in the inverters 4 and 5 and the motor 6 when a large current flows at the time of quick charging.

Second Embodiment

Next, a charging device 1 in a second embodiment is described. The second embodiment is different from the first embodiment in that a connection state of two storage batteries 2 and 3 is switched between a connection in series and a connection in parallel while the inverters 4 and 5 and a motor 6 are bypassed, when the charging device 1 is charged with power supplied from an external power supply. In the second embodiment, the description of the configuration similar to that in the above first embodiment is omitted, and the reference signs thereof are referred to.

Figure 3:
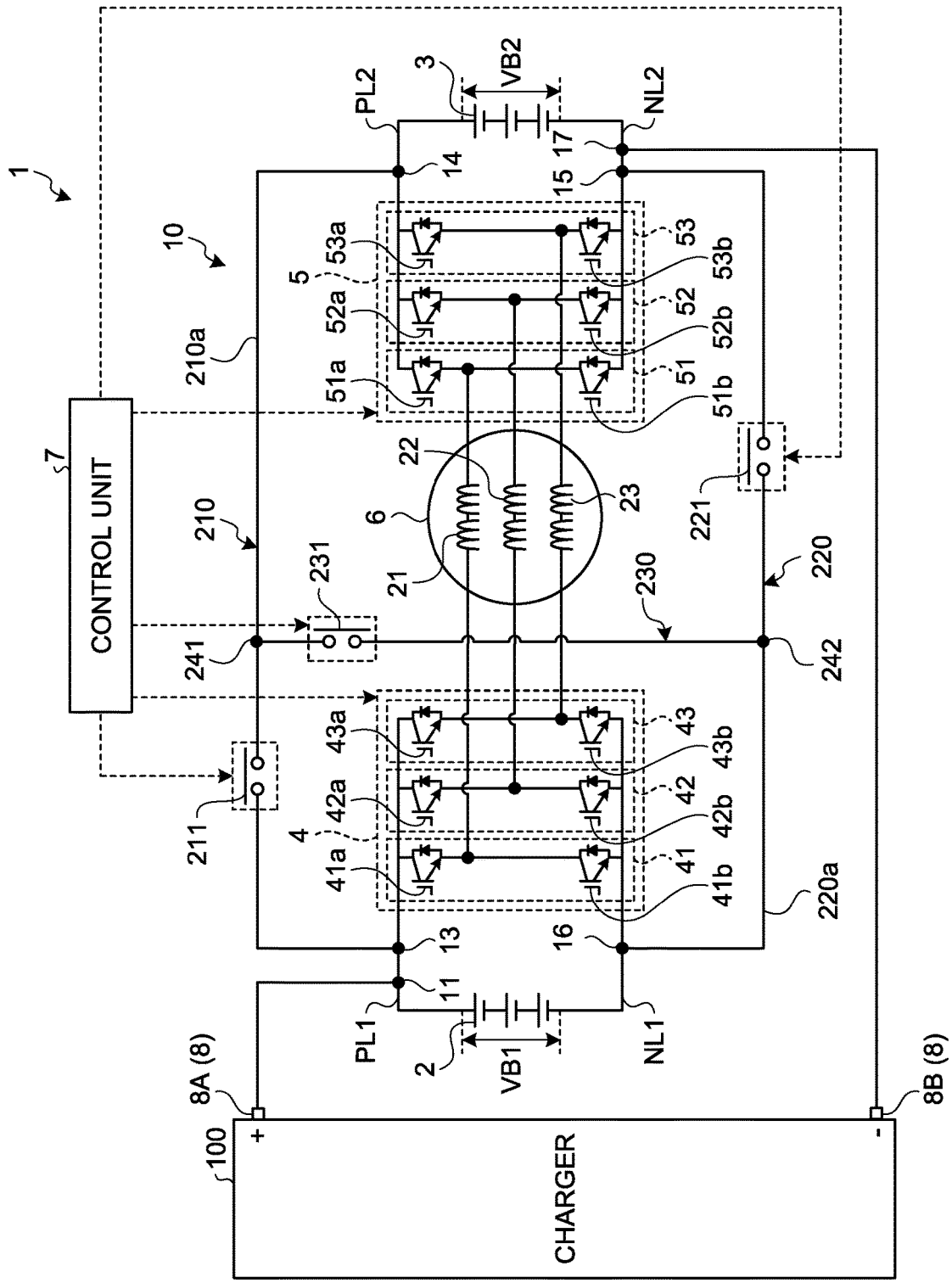
FIG. 3 is a diagram schematically illustrating a charging device in a second embodiment.

FIG. 3 is a diagram schematically illustrating a charging device in the second embodiment. As illustrated in FIG. 3, a negative electrode terminal 8B of a charging port 8 is connected to the negative electrode side of the second storage battery 3 in the second embodiment. The negative electrode terminal 8B of the charging port 8 is connected to a seventh connection point 17 provided on a negative-electrode-side line NL2 between the negative electrode of a second storage battery 3 and the second inverter 5. The charging device 1 in the second embodiment further includes a third bypass circuit 230 in addition to a first bypass circuit 210 and a second bypass circuit 220.

The third bypass circuit 230 forms a path for bypassing the inverters 4 and 5 and the motor 6 between the negative electrode of the first storage battery 2 and the positive electrode of the second storage battery 3. As illustrated in FIG. 3, the third bypass circuit 230 forms a path connecting the first bypass circuit 210 and the second bypass circuit 220.

Specifically, on the first bypass circuit 210 side, the downstream side of the third bypass circuit 230 is connected to a first bypass connection point 241 provided in a downstream connection path 210a between a first relay 211 and a fourth connection point 14. On the second bypass circuit 220 side, the upstream side of the third bypass circuit 230 is connected to a second bypass connection point 242 provided in an upstream connection path 220a between a sixth connection point 16 and a second relay 221. In addition, the third bypass circuit 230 includes a third relay 231. The third relay 231 switches between an opened state and a closed state, and selectively conductively connects the third bypass circuit 230. The third relay 231 is controlled by the control unit 7 to be opened and closed.

In the charging device 1 in the second embodiment, it is possible to support different charging standards by switching a connection state of the two storage batteries 2 and 3 between a connection in parallel (a parallel connection state) and a connection in series (a series connection state) when the storage batteries 2 and 3 are charged with power from a charger 100. As a quick charge standard, a charging station that outputs DC power is considered. As different charging standards, a super quick charging standard for a maximum output of 150 kW class and a super quick charging standard for a maximum output of 350 kW class are considered. Thus, in order for the charging device 1 in the second embodiment to support a plurality of super quick charging standards, the two storage batteries 2 and 3 are connected by the relays 211, 221, and 231 via the bypass circuits, and the connection state is switched to a connection in parallel or a connection in series.

Figure 4:
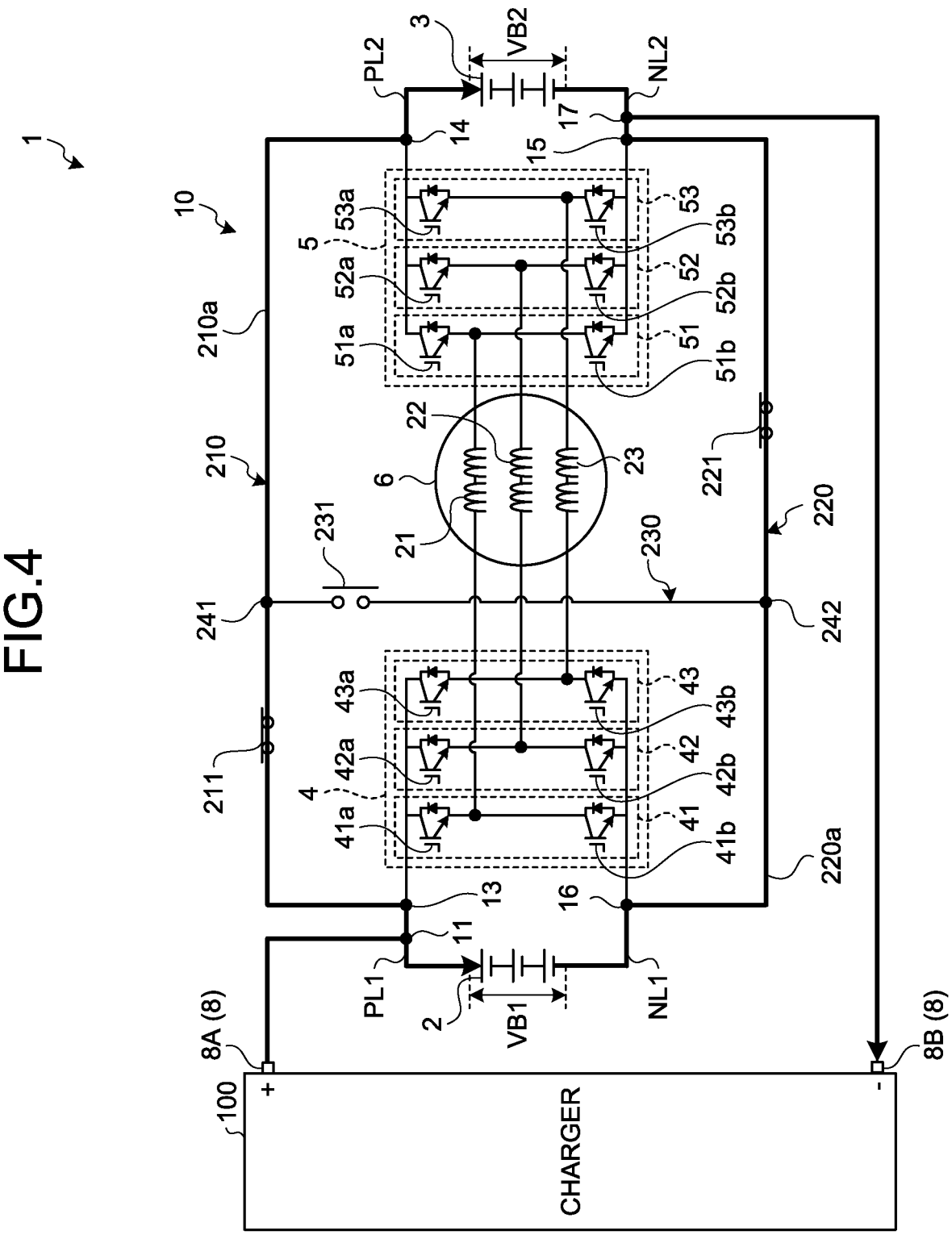
FIG. 4 is a diagram illustrating that the charging device in the second embodiment is charged with power supplied from an external power supply while two storage batteries are connected in parallel.
Figure 5:
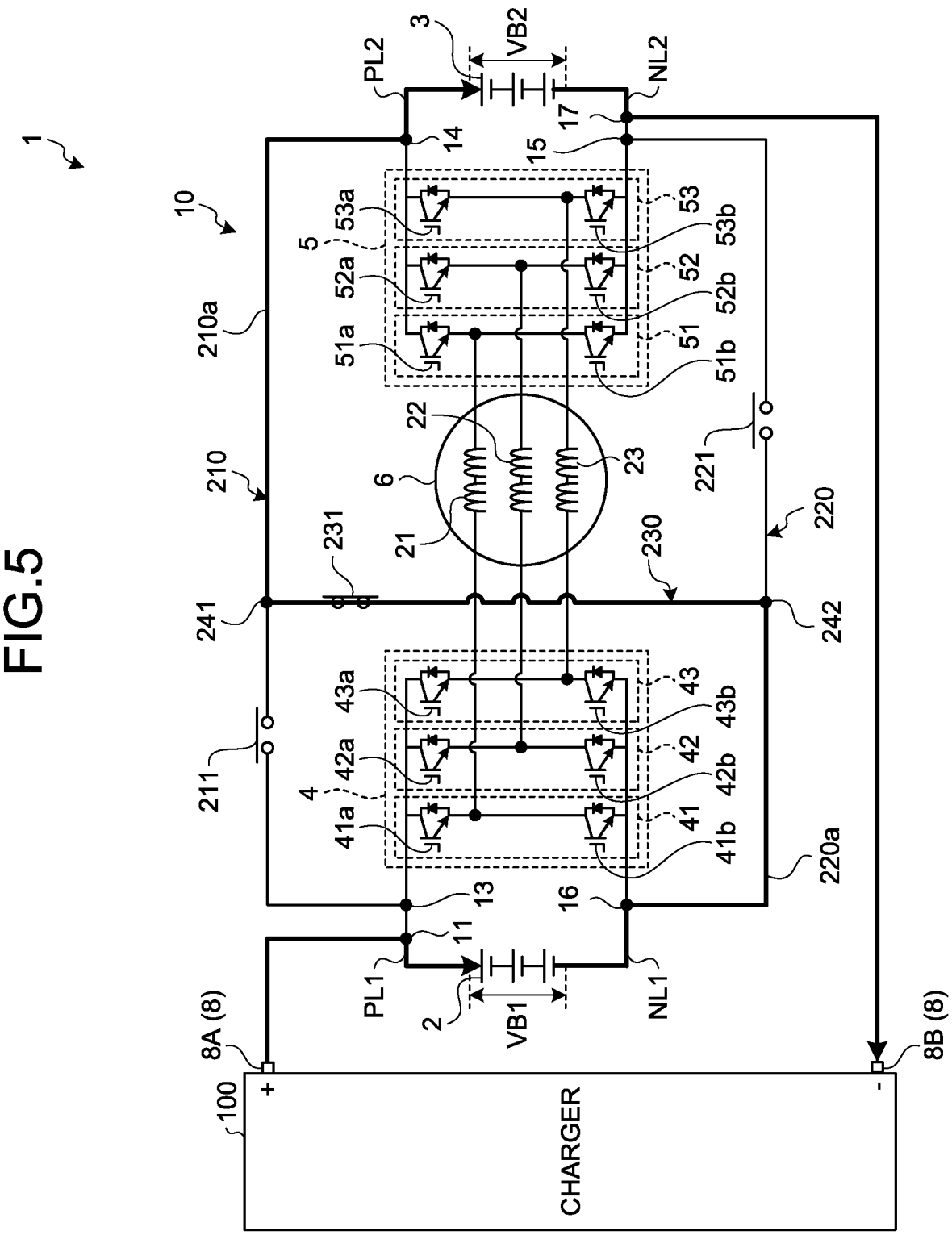
FIG. 5 is a diagram illustrating that the charging device in the second embodiment is charged with power supplied from an external power supply while two storage batteries are connected in series.

Here, description is made with reference to FIGS. 4 and 5 on two cases in which the two storage batteries 2 and 3 are connected in parallel and charged, and in which the two storage batteries 2 and 3 are connected in series and charged, while the inverters 4 and 5 and motor 6 are bypassed.

FIG. 4 is a diagram illustrating that the charging device in the second embodiment is charged with power supplied from an external power supply while two storage batteries are connected in parallel. As illustrated in FIG. 4, at the time of charging, the first relay 211 and the second relay 221 are turned on (ON) to connect the first bypass circuit 210 and the second bypass circuit 220, and the third relay 231 is turned off (OFF) to cut off the third bypass circuit 230. Thus, the charging plug of the charger 100 is connected to the charging port 8 of the charging device 1 while the first storage battery 2 and the second storage battery 3 are being connected in parallel to bypass the inverters 4 and 5 and the motor 6.

For example, the charger 100 is a quick charging station capable of outputting power (first power) having a maximum output of 150 kW at a maximum voltage of 500 V (first value) and a maximum current of 400 A. In this case, the charging device 1 connects the two storage batteries 2 and 3 in parallel in a bypass state in which the first bypass circuit 210 and the second bypass circuit 220 are conductively connected, and charges the respective storage batteries 2 and 3 with the power supplied from the charger 100 configured to support the 150-kW-class super quick charging standard. On the charging device 1 side, a voltage VB1 of the first storage battery 2 is designed to be 500 V, and a voltage VB2 of the second storage battery 3 is designed to be 500 V. That is, the voltage VB1 of the first storage battery 2 and the voltage VB2 of the second storage battery 3 are set to the same value as the maximum voltage (first value) of the external power supply configured to support the 150-kW-class super quick charging standard.

Then, when DC power from the charger 100, which is the external power supply having a maximum output of 150 kW, is supplied to the charging device 1 in the bypass state and in the parallel connection state illustrated in FIG. 4, current of 400 A flows from the positive electrode terminal 8A of the charging port 8 into the power supply circuit 10, and the current is divided at the first connection point 11 into the current (200 A) on the first storage battery 2 side and the current (200 A) on the second storage battery 3 side.

On the first storage battery 2 side, the current of 200 A flows from the first connection point 11 into the positive electrode of the first storage battery 2. Thereafter, the current flowing from the negative electrode of the first storage battery 2 into the negative-electrode-side line NL1 reaches the sixth connection point 16. Then, the current flows from the sixth connection point 16 into the second bypass circuit 220. This current reaches the fifth connection point 15 via the second bypass circuit 220 and the second relay 221. The current flowing from the fifth connection point 15 into the negative-electrode-side line NL2 reaches the seventh connection point 17. Then, the current flows into the negative electrode terminal 8B of the charging port 8 via the seventh connection point 17.

On the other hand, on the second storage battery 3 side, the current of 200 A flows from the first connection point 11 into the first bypass circuit 210 via the third connection point 13. This current reaches the fourth connection point 14 via the first bypass circuit 210 and the first relay 211. This current flows from the fourth connection point 14 into the positive-electrode-side line PL2, and flows into the positive electrode of the second storage battery 3 via the positive-electrode-side line PL2. Thereafter, the current flowing from the negative electrode of the second storage battery 3 into the negative-electrode-side line NL2 reaches the seventh connection point 17. The current flowing from the negative electrode of the second storage battery 3 into the negative-electrode-side line NL2 merges at the seventh connection point 17 with the current flowing from the fifth connection point 15 into the negative-electrode-side line NL2 via the first storage battery 2. Thus, the current merged at the seventh connection point 17 flows from the seventh connection point 17 into the negative electrode terminal 8B of the charging port 8.

FIG. 5 is a diagram illustrating that the charging device in the second embodiment is charged with power supplied from an external power supply while two storage batteries are connected in series. As illustrated in FIG. 5, at the time of charging, the third relay 231 is turned on (ON) to connect the third bypass circuit 230, and the first relay 211 and the second relay 221 are turned off (OFF) to cut off the first bypass circuit 210 and the second bypass circuit 220. Thus, the charging port 8 of the charging device 1 is connected to the charger 100 while the first storage battery 2 and the second storage battery 3 are being connected in series to bypass the inverters 4 and 5 and the motor 6.

For example, the charger 100 is a quick charging station capable of outputting power (second power) having a maximum output of 350 kW at a maximum voltage of 1000 V (second value) and a maximum current of 400 A. In this case, the charging device 1 connects the two storage batteries 2 and 3 in series in a bypass state in which the third bypass circuit 230 is conductively connected, and charges the respective storage batteries 2 and 3 with the power supplied from the charger 100 configured to support the 350-kW-class super quick charging standard. Also in this case, on the charging device 1 side, the voltage VB1 of the first storage battery 2 is designed to be 500 V, and the voltage VB2 of the second storage battery 3 is designed to be 500 V. That is, the sum of the voltage VB1 of the first storage battery 2 and the voltage VB2 of the second storage battery 3 is set to the same value as the maximum voltage of the external power supply configured to support the 350-kW-class super quick charging standard.

Then, when DC power from the charger 100, which is the external power supply having a maximum output of 350 kW, is supplied to charging device 1 in the bypass state and in the series connection state illustrated in FIG. 5, current of 400 A flowing from the positive electrode terminal 8A of the charging port 8 into the first connection point 11 of the power supply circuit 10 flows from the first connection point 11 into the positive electrode of the first storage battery 2. The current flowing from the negative electrode of the first storage battery 2 into the negative-electrode-side line NL1 flows into the second bypass circuit 220 via the sixth connection point 16. This current flows through the upstream connection path 220a of the second bypass circuit 220 and flows from the second bypass connection point 242 into the third bypass circuit 230. This current reaches the first bypass connection point 241 via the third bypass circuit 230 and the third relay 231. Then, the current flows into the first bypass circuit 210 via the first bypass connection point 241. This current flows through the downstream connection path 210a of the first bypass circuit 210 and reaches the fourth connection point 14. This current flows from the fourth connection point 14 into the positive-electrode-side line PL2, and flows into the positive electrode of the second storage battery 3 via the positive-electrode-side line PL2. Thereafter, the current flowing from the negative electrode of the second storage battery 3 into the negative-electrode-side line NL2 flows into the negative electrode terminal 8B of the charging port 8 via the seventh connection point 17.

In the second embodiment, by charging the charging device 1 in the above series connection state illustrated in FIG. 5, it is possible to support the external power supply that outputs 350-kW-class power. In this manner, it is possible for the charging device 1 in the second embodiment to support a plurality of super quick charging standards by switching a connection state of the two storage batteries 2 and 3 between a connection in parallel and a connection in series while the inverters 4 and 5 and the motor 6 are bypassed.

As described above, according to the charging device 1 in the second embodiment, it is possible to support the charger 100 configured for a plurality of super quick charging standards with different voltages while the inverters 4 and 5 and the motor 6 are bypassed. Thus, it is possible for the charging device 1 including a double-ended inverter system to support both the 150-kW-class super quick charging standard and the 350-kW-class super quick charging standard.

In the above second embodiment, it has been described that the voltage VB1 of the first storage battery 2 and the voltage VB2 of the second storage battery 3 are each designed to be 500 V, but the voltage value of each of the storage batteries 2 and 3 is not limited thereto. For example, the voltage of each of the storage batteries 2 and 3 may be designed to be 400 V. The voltage of each of the storage batteries 2 and 3 is a value smaller than the maximum voltage corresponding to at least the 350-kW-class super quick charging standard, and is only required to be a value close to the maximum voltage corresponding to the 150-kW-class super quick charging standard.

In addition, the maximum voltage defining the 150-kW-class super quick charging standard may be set to 500 V, and the voltages VB1 and VB2 of the storage batteries 2 and 3 each may be set to 400 V. Furthermore, the maximum voltage defining the 350-kW-class super quick charging standard may be set to a second value in the range of 900 V to 1000 V. In this case, the voltages VB1 and VB2 of the storage batteries 2 and 3 each may be set so as to be half the second value. Note that, in the conventional 50-kW-class quick charging standard, the maximum voltage is 500 V, and the maximum current is 125 A. The 150-kW-class and 350-kW-class super quick charging standards described in this specification mean charging standards having a larger maximum current value than that of the conventional 50-kW-class quick charging standards.

According to the disclosure, since current can flow in the first bypass circuit and the second bypass circuit at the time of charging from the external power supply, it is possible to bypass the inverters and the load. Thus, it is possible to prevent current from flowing to the inverters and the motor at the time of charging. Accordingly, it is possible to improve the charging efficiency, and to prevent heat from being generated in the inverters and the load due to the conduction at the time of charging.

According to the disclosure, since current can flow in the third bypass circuit at the time of charging from the external power supply, it is possible to bypass the inverters and the load.

According to the disclosure, it is possible for the downstream side of the first bypass circuit and the upstream side of the second bypass circuit to be connected by the third bypass circuit. Thus, it is possible to share a part of the configuration of each bypass circuit, and to prevent the circuit configuration from being complicated.

According to the disclosure, although external power supplies have different charging standards, it is possible to switch a connection state of the two storage batteries between a connection in series and a connection in parallel while the inverters and the load are bypassed, and it is possible to support external power supplies having different voltages.

According to the disclosure, it is possible to support the first power and the second power having different maximum power and to charge the storage batteries with power supplied from the external power supply while the inverters and the load are bypassed. Thus, it is possible to support a plurality of super quick charging standards having different output voltages.

According to the disclosure, since the voltage of the first storage battery and the voltage of the second storage battery are each set to the first value, it is possible to charge the first storage battery and the second storage battery connected in parallel while the inverters and the load are bypassed at the time of charging with the power supplied from the external power supply that outputs the first power having the maximum voltage of the first value. In addition, since the sum of the voltage of the first storage battery and the voltage of the second storage battery is set to the second value, it is possible to charge the first storage battery and the second storage battery connected in series while the inverters and the load are bypassed at the time of charging with the power supplied from the external power supply that outputs the second power having the maximum voltage of the second value.

According to the disclosure, it is possible to allow current to bypass a first inverter, a second inverter, and a load when a first storage battery and a second storage battery are charged with power supplied from an external power supply. Thus, it is possible to improve the charging efficiency at the time of charging from the external power supply, and to prevent heat from being generated in the inverters and the load due to the conduction at the time of charging.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charging device comprising:
   a power supply circuit comprising a first inverter connected between a first storage battery and a load, and a second inverter connected between a second storage battery and the load, the power supply circuit being configured to drive the one load;
   a charging port configured to be connected to an external power supply when the first storage battery and the second storage battery are charged with power from the external power supply; and
   a relay configured to allow current to bypass the first inverter, the second inverter, and the load between a positive electrode terminal of the charging port and a negative electrode terminal of the charging port, when the first storage battery and the second storage battery are charged with the power from the external power supply, wherein
   the positive electrode terminal of the charging port is connected to a positive electrode side of the first storage battery,
   the negative electrode terminal of the charging port is connected to a negative electrode side of the second storage battery,
   the charging device further comprises:
   a first bypass circuit connected between the positive electrode side of the first storage battery and a positive electrode side of the second storage battery in parallel to the first inverter, the second inverter, and the load;

a second bypass circuit connected between a negative electrode side of the first storage battery and the negative electrode side of the second storage battery in parallel to the first inverter, the second inverter, and the load; and a third bypass circuit connected between the negative electrode side of the first storage battery and the positive electrode side of the second storage battery in parallel to the first inverter, the second inverter, and the load, and the relay comprises:

a first relay provided in the first bypass circuit;

a second relay provided in the second bypass circuit; and a third relay provided in the third bypass circuit.

2. The charging device according to claim 1, wherein the third bypass circuit is connected to connect a first bypass connection point to a second bypass connection point, the first bypass connection point is provided between the first relay and the positive electrode side of the second storage battery in the first bypass circuit, and the second bypass connection point is provided between the negative electrode side of the first storage battery and the second relay in the second bypass circuit.

3. The charging device according to claim 1, wherein when a power output from the external power supply is predetermined first power, the first relay and the second relay are closed, and the third relay is opened to connect the first storage battery to the second storage battery in parallel via the first bypass circuit and the second bypass circuit in order to charge the first storage battery and the second storage battery with the first power, and when a power output from the external power supply is second power larger than the first power, the first relay and the second relay are opened, and the third relay is closed to connect the first storage battery to the second storage battery in series via the third bypass circuit in order to charge the first storage battery and the second storage battery with the second power.

4. The charging device according to claim 3, wherein the first power is power having a maximum voltage of a first value and a maximum current of a predetermined current value, and the second power is power having a maximum voltage of a second value larger than the first value and a maximum current of the predetermined current value.

5. The charging device according to claim 4, wherein a voltage of the first storage battery and a voltage of the second storage battery are each set to the first value, and the sum of the voltage of the first storage battery and the voltage of the second storage battery is set to be the second value.

6. The charging device according to claim 2, wherein when a power output from the external power supply is predetermined first power, the first relay and the second relay are closed, and the third relay is opened to connect the first storage battery to the second storage battery in parallel via the first bypass circuit and the second bypass circuit in order to charge the first storage battery and the second storage battery with the first power, and when a power output from the external power supply is second power larger than the first power, the first relay and the second relay are opened, and the third relay is closed to connect the first storage battery to the second storage battery in series via the third bypass circuit in order to charge the first storage battery and the second storage battery with the second power.

7. The charging device according to claim 6, wherein the first power is power having a maximum voltage of a first value and a maximum current of a predetermined current value, and the second power is power having a maximum voltage of a second value larger than the first value and a maximum current of the predetermined current value.

8. The charging device according to claim 7, wherein a voltage of the first storage battery and a voltage of the second storage battery are each set to the first value, and the sum of the voltage of the first storage battery and the voltage of the second storage battery is set to be the second value.

* * * * *